H. A. ARCHIBALD.
MACHINE FOR CUTTING RIBBONS OF PLASTIC, SEMIPLASTIC, OR SOLID MATERIAL.
APPLICATION FILED OCT. 1, 1920.

1,437,742.

Patented Dec. 5, 1922.

INVENTOR
Harry a. archibald
BY Clarence G. Galston
ATTORNEY

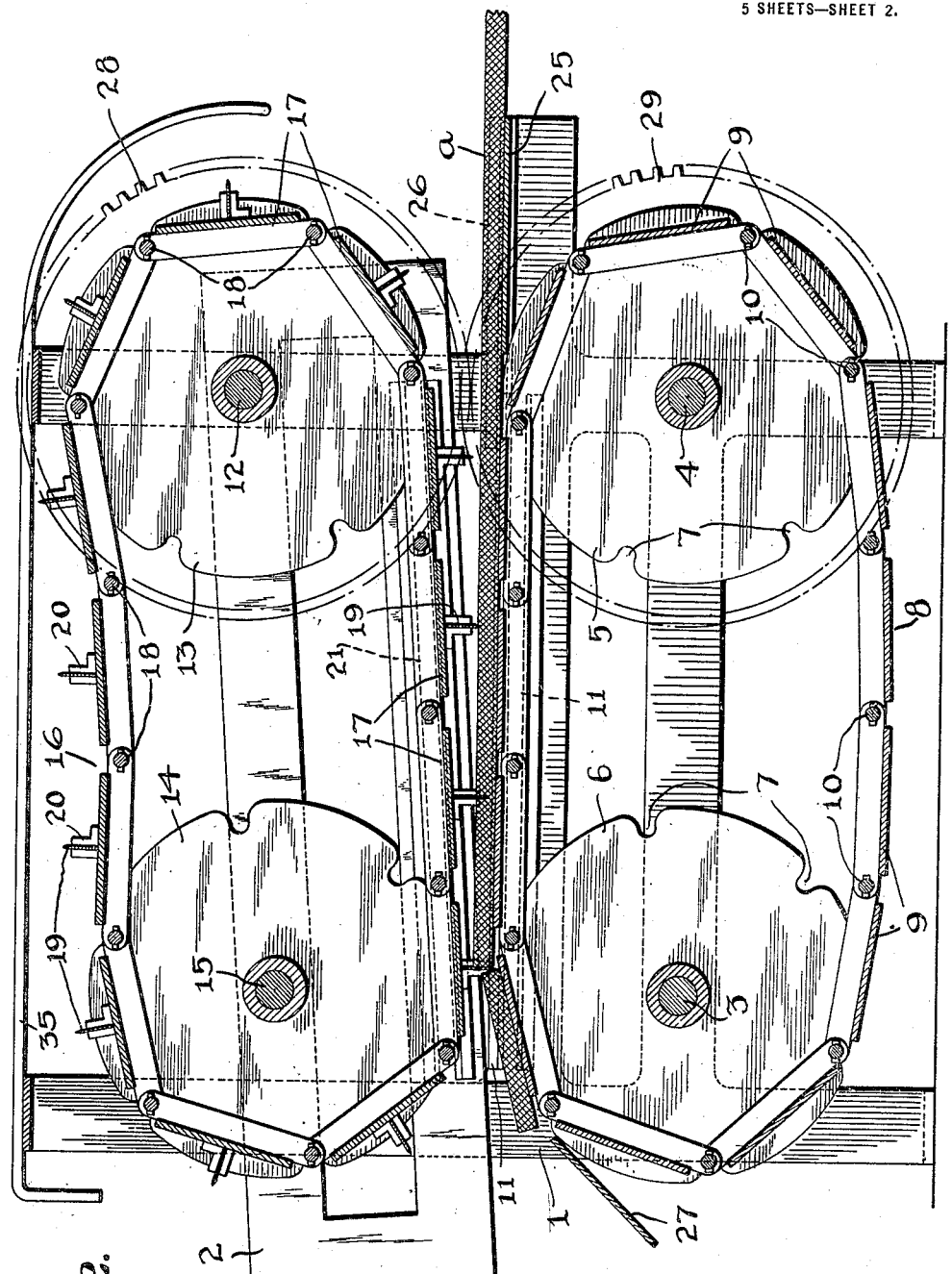

H. A. ARCHIBALD.
MACHINE FOR CUTTING RIBBONS OF PLASTIC, SEMIPLASTIC, OR SOLID MATERIAL.
APPLICATION FILED OCT. 1, 1920.
1,437,742.
Patented Dec. 5, 1922.
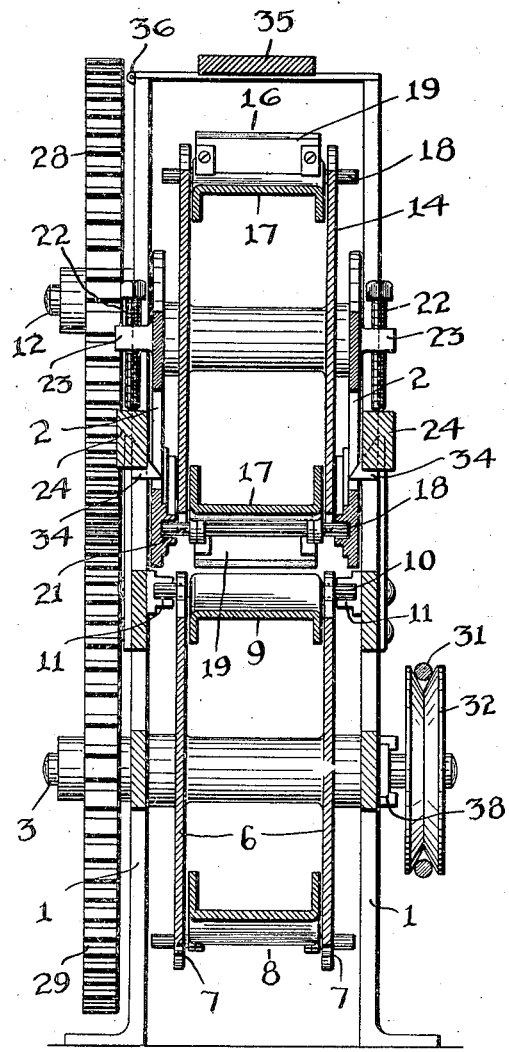
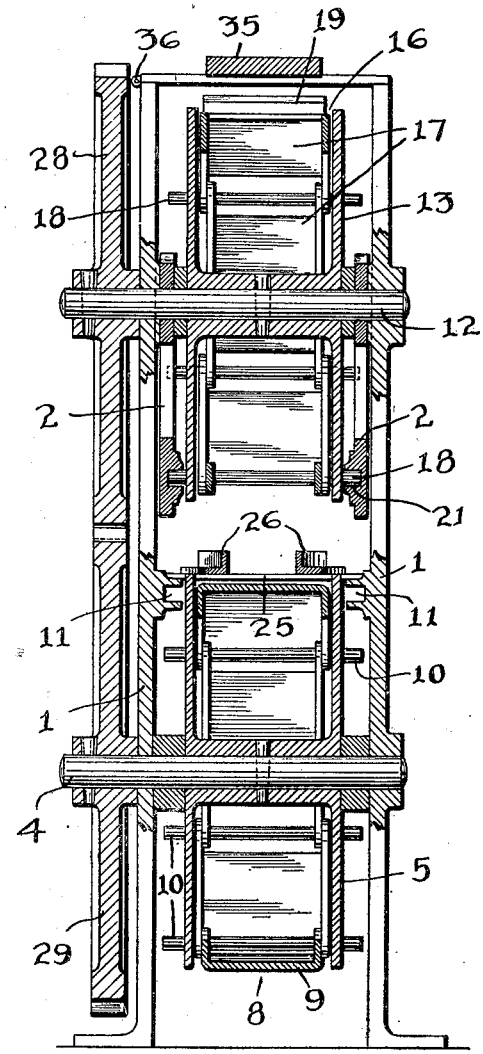
INVENTOR
Harry A. Archibald
BY
ATTORNEY H. A. ARCHIBALD.
MACHINE FOR CUTTING RIBBONS OF PLASTIC, SEMIPLASTIC, OR SOLID MATERIAL.
APPLICATION FILED OCT. 1, 1920.

1,437,742.

Patented Dec. 5, 1922.

INVENTOR
Harry G. Archibald
BY Clarence J. Galston
ATTORNEY

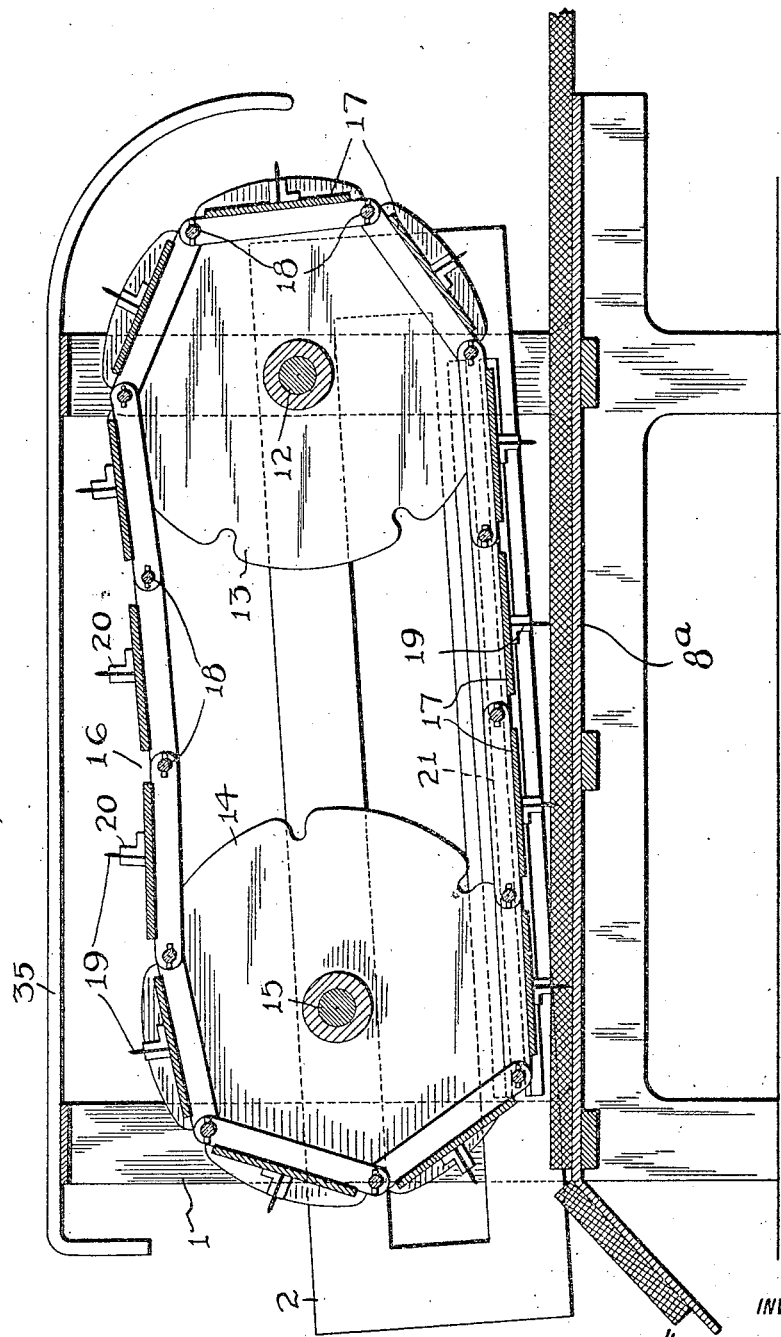

Patented Dec. 5, 1922.

1,437,742

UNITED STATES PATENT OFFICE.

HARRY A. ARCHIBALD, OF NEW ROCHELLE, NEW YORK.

MACHINE FOR CUTTING RIBBONS OF PLASTIC, SEMIPLASTIC, OR SOLID MATERIAL.

Application filed October 1, 1920. Serial No. 414,005.

*To all whom it may concern:*

Be it known that I, HARRY A. ARCHIBALD, a citizen of the United States, residing in the city of New Rochelle, State of New York, have invented a new and useful Improvement in a Machine for Cutting Ribbons of Plastic, Semi-Plastic, or Solid Material, of which the following is a specification.

The object of the invention is to provide a machine for accurately cutting delicate ribbons of plastic, semiplastic, or solid material into rectangular briquets of uniform shape and proportions.

To this end the invention comprises the novel construction and combination of parts hereinafter described and more particularly pointed out in the claims, whereby the traveling ribbon is always kept in uniform condition as it passes beneath the knives and is severed into identical pieces.

Fig. 2 is a central vertical longitudinal section;

Fig. 3 is a vertical transverse section on the line 3—3 of Fig. 1;

Fig. 4 is a vertical transverse section on the line 4—4 of Fig. 1;

Figure 1:
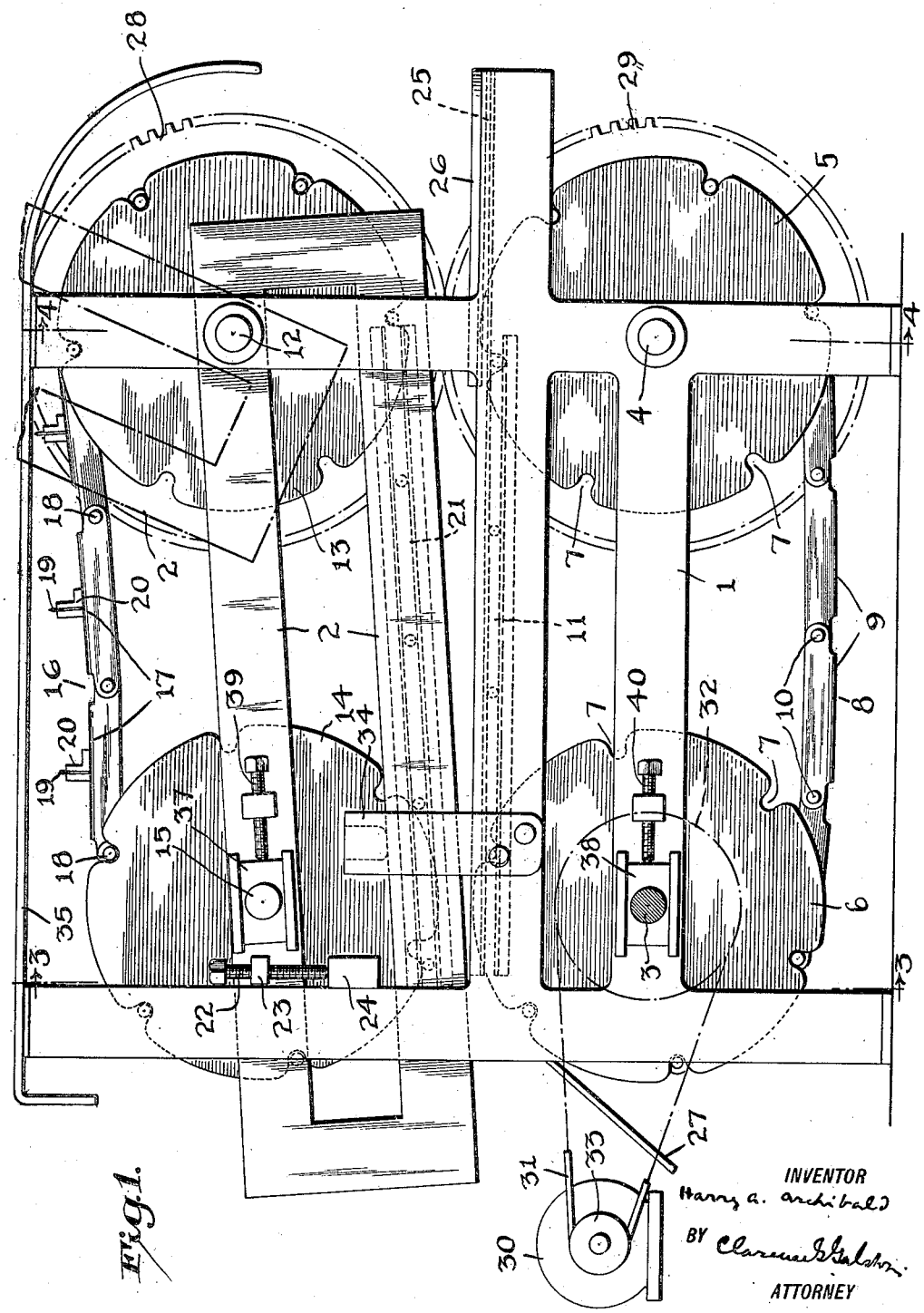
Fig. 1 is a side elevation of the preferred form of the machine, dotted lines being used to indicate the manner in which the upper or sub-frame can be thrown back.
Figure 5:
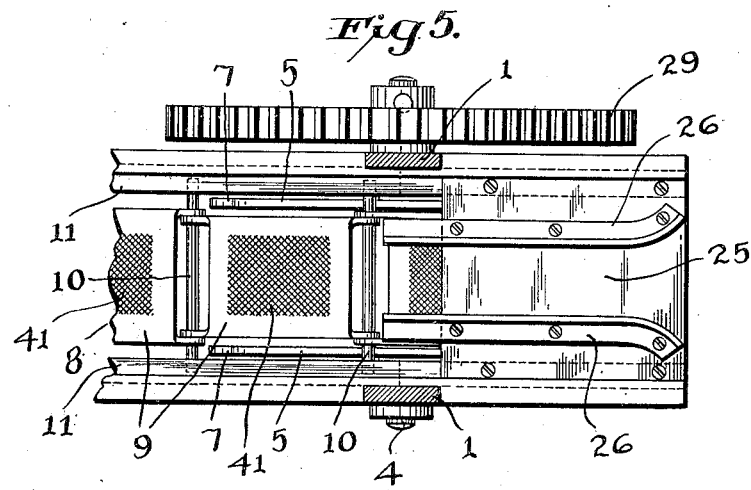
Fig. 5 is a sectional plan view looking down on the rear portion of the supporting belt together with the receiving table and the gear on the rear shaft of said belt.
Figure 6:
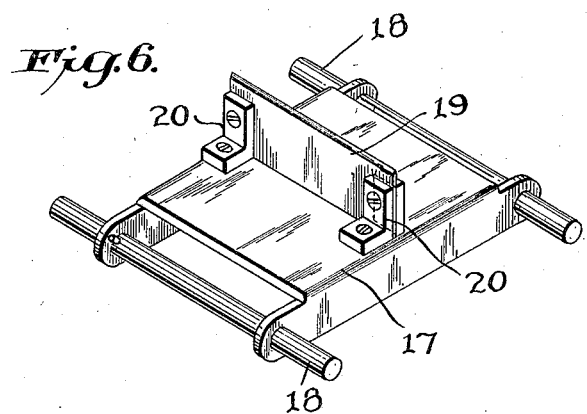
Fig. 6 is a perspective view of one of the links of the knife belt.
Figure 7:
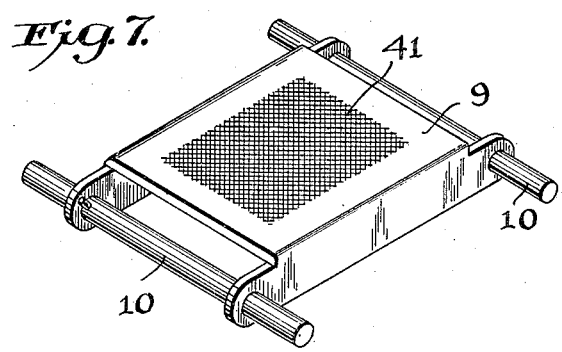
Fig. 7 is a perspective view of one of the links of the supporting belt.

The machine has a suitable frame, comprising a main frame 1 and a sub-frame 2. Transverse shafts 3 and 4 are journaled toward the front and rear of the lower part of the main frame. Fixed to these shafts are carrying wheels 5, 6, each of which comprises a pair of laterally spaced disks with notches 7 in their edges. A longitudinally unyielding belt 8, composed of flat rigid links 9 and pintles 10, passes about the wheels 5 and 6, the ends of its pintles being extended for driving engagement with the notches 7 and for anti-friction engagement with straight slotted rigid guides 11 fixed on the inner sides of the side members of the main frame in position to support the upper or working stretch of this belt.

An upper rear shaft 12 is journaled in the main frame, above the shaft 4, and constitutes a pivotal support for the sub-frame 2. A notched carrying wheel 13, similar to the wheels 5 and 6, is fixed to this shaft, and another carrying wheel 14 is mounted on a transverse shaft 15 supported in the forward part of the sub-frame, above the shaft 3. An upper belt 16, composed of rigid links 17 and pintles 18, passes about the wheels 13 and 14, and on the outer sides of the links of this belt are transverse knives 19. The ends of these knives are attached removably and rigidly to side brackets 20 on the links, and are set at such angle to their links as to be substantially perpendicular in the lower working stretch of the knife belt to the upper working stretch of the supporting belt. The said working stretch of the knife belt is guided in straight rigid channeled guides 21 on the inner sides of the side members of the sub-frame 2. The two belts with their guides are disposed in convergent relation upon the frame, the angle of convergence being very acute, so that in the passage from rear to front the knives gradually approach the support while traveling therewith. Screws 22, threaded through lugs 23 on the pivotal sub-frame 2 and resting upon abutments 24 upon the main frame, support the forward part of the sub-frame, and enable the angle between the belts, and the penetration of the knives, to be exactly regulated.

The ribbon *a*, for example a ribbon of soap or other substantially plastic material, advanced from suitable ribbon-forming means, arrives upon a receiving table 25 supported on the rear portion of the main frame in line with the upper working stretch of the belt 8, and is laterally guided between guides 26 on the table. At the forward or delivery end of the machine, a chute 27 is provided to guide the briquets from the machine, where the belt 8 turns and passes downward around its carrier 6. The shafts 4 and 12 of the two belts are provided with meshing gear wheels 28 and 29, of equal size, whereby the two belts are positively interconnected so as to operate in unison. The belts are driven, or partly driven, or in any event directly governed, by the material, so that the belts take the speed of the ribbon as it comes from the forming means, which speed may vary. A light motor 30, connected with the shaft 3 by a belt 31 passing about pulleys 32 and 33 on said shaft and the shaft of the motor, respectively, tends to drive the belts 8 and 16, with capacity for slippage both between the band and its pulleys and in the motor itself, so that the ribbon proceeds substantially at its own speed without attenuation or buckling, the coacting belts being accelerated or retarded in accordance with the rate of advance of the material.

The sub-frame 2 carrying the knife belt and its guides can be swung up and back for access in cleaning, and is normally held down by spring catches 34. A top guard 35 is provided over the sub-frame and knife belt, and is hinged to the main frame at one side, as indicated at 36, so that it can be moved out of the way when the sub-frame is raised. When the sub-frame is lowered again the stop screws 22 strike the abutments 24 and automatically arrest the downward movement at the proper point. The bearings 37 and 38 of the shafts 3 and 15 are slidable in the respective frame parts, and can be adjusted by screws 39, 40 to take up slack in the belts.

The tops of the links 9 of the supporting belt may either be entirely smooth or provided with friction surfaces or pads 41. The carrying wheels of the upper and lower belts are of substantially the same diameter and their links of substantially the same length. If the proportions are precisely the same, there will be a slight slippage between the ribbon and the under belt, to avoid which the carriers 13 and 14 may be made slightly larger in diameter and the links 17 slightly longer, to the end that the speed of the knives, measured parallel with the working stretch of the lower belt, may be exactly equal to that of said belt. The belts need not in all instances be of link construction, and various other changes in form, proportion and relative arrangement may be made without departing from the spirit of the invention.

What is claimed as new is:

In a machine for cutting a plastic ribbon into briquets, the combination with an upper cutting belt composed of rigid pivotally connected links, cutting knives mounted rigidly on links of the belt, wheels for the belt, and rigid guides for the links in the lower course, of a lower carrying belt to which the cutting belt is in convergent relation, said carrying belt also composed of rigid pivotally connected links together forming a traveling table, wheels for the carrying belt, and rigid anti-friction guiding means for its upper course, the belts being interconnected through their wheels and impelled by the ribbon.

HARRY A. ARCHIBALD.